MAGNETIC TAPE WITH REINFORCED BACKING
Filed Oct. 4, 1961
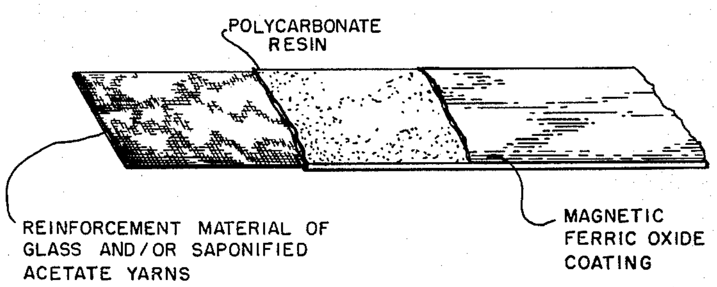
INVENTOR,
ADOLPHE RUSCH.
BY Harry M. Saragovitz
ATTORNEY.

United States Patent Office 3,179,533

Patented Apr. 20, 1965

3,179,533
MAGNETIC TAPE WITH REINFORCED BACKING

Adolphe Rusch, Rumson, N.J., assignor to the United States of America as represented by the Secretary of the Army Filed Oct. 4, 1961, Ser. No. 142,988
3 Claims. (Cl. 117—76)
(Granted under Title 35, U.S. Code (1952), sec. 266)

The invention described herein may be manufactured and used by or for the Government for governmental purposes, without the payment of any royalty thereon.

This invention relates to an improved magnetic tape composed of a backing material of continuous multi-filament glass yarns and/or continuous multi-filament saponified acetate yarns in which the glass and/or saponified acetate yarns are impregnated and bonded with polycarbonate resin and where the impregnated backing material bears on one of its surfaces a coating from a dispersion of magnetic ferric oxide powder in polycarbonate solvent containing some polycarbonate resin.

Commercially available magnetic tapes generally include an unreinforced backing material of either cellulose acetate or polyester film where one of the surfaces of the backing material is coated with magnetic ferric oxide by means of an adhesive.

When cellulose acetate is used as the backing material, the basic cellulose acetate or "acetate flake" is first prepared by reacting raw cellulose, such as cotton linters, with acetic acid. Subsequent refining treatments result in purified cellulose acetate flake. A mixture of this flake, organic solvent, and plasticizer is then flowed in a wide uniform sheet or ribbon onto the highly polished surface of a very large diameter revolving wheel. The surface of this wheel is enclosed and warm air blown through the enclosure evaporates the solvents from the layer of dope on the casting wheel surface. The resulting film can then be continuously stripped from the casting surface.

When polyester film is used as the backing material, it is extruded directly in sheeting form. Subsequent to its extrusion in a sheet, the molecules are oriented by a system of stretching in lateral and longitudinal directions simultaneously. There results a high strength film for use as a backing material.

Both the cellulose acetate and the polyester (polyethylene terephthalate) type magnetic tape backing materials are in current use. However, both of these materials suffer from high elongation and permanent set when subjected to tensile stress. Because the polyester films are stronger, more heat resistant, less moisture absorbent, and less brittle than the cellulose acetate type films, the polyester films are being used almost exclusively for sensitive electronic recording and memory systems. The term "sensitive" used herein relates to the ability of the system to reproduce weak threshold signals as well as strong signals. Though polyester magnetic tapes are the best magnetic tapes presently available for use in highly sensitive electronic recording systems, they have been found to have insufficient reliability and dimensional stability for such items as recording, storage and play-back equipment such as computers, satellite data recording devices, etc. This is because of the tendency of polyester film to elongate under tensile stress, the high permanent set of the polyester film due to elongation, and the poor adhesion of the magnetic coating to the polyester film or backing.

An object of this invention is to overcome the difficulties inherent in the use of polyester film as the backing material of magnetic tapes especially for highly sensitive applications. A further object is to make a magnetic tape having less elongation and permanent set, better adhesion to magnetic coatings and greater dimensional stability than magnetic tape backing materials now available. A still further object is to make a magnetic tape suitable for use in both less sensitive applications as, for example, audio and for highly sensitive electronic applications such as automatic data processing equipment for satellite and space application.

It has been found that the aforementioned objectives can be attained by making a magnetic tape including a backing material of continuous multi-filament glass yarns and/or continuous multi-filament saponified acetate yarns in which the glass and/or saponified acetate yarns are impregnated and coated with polycarbonate resin and where the impregnated backing material bears on one of its surfaces an additional coating from a dispersion of magnetic ferric oxide powder in polycarbonate solvent containing some polycarbonate resin.

The backing material or reinforcement of the improved magnetic tapes of this invention is composed mainly of either continuous multi-filament glass yarns or continuous multi-filament saponified acetate yarns bonded and laminated by means of impregnation with polycarbonate resin. Two types of reinforcements both composed of glass and/or saponified acetate yarn are applicable, to wit, woven and unwoven. The woven reinforcement is suited for use in highly sensitive electronic application whereas the unwoven reinforcement is suited for use in less sensitive applications.

The woven reinforcement contains a warp composed of very fine size continuous multi-filament glass or saponified acetate yarn. It is woven on either a broad loom or a ribbon loom. The weave may be plain, twill, broken twill, or a single or double face satin construction and is designed especially to give high unidirectional tensile strength and a smooth surface to the face of the backing material. The filling is woven with a sufficient number of picks per inch to reduce slippage of the warp threads and is composed of either glass threads or a low twist ultra-thin relatively soft yarn which will act as a cushion to prevent breakage of the glass warp threads when exposed to constant flexing. The filling material may be rayon, cellulose acetate, saponified actate, cotton, linen, nylon, orlon, dacron, raw or thrown silk, polyester fibre, or coated glass, etc.

The unwoven reinforcement is composed of continuous unidirectional parallel evenly-spaced threads of continuous multi-filament glass or saponified acetate yarns fed from either a warp or directly from spools, pirns, or bobbins placed on a creel from which the threads are fed through a condensing reed to attain the proper width.

In the case of both the woven and unwoven reinforcements, the reinforcing material is impregnated with a polycarbonate resin from solution by a continuous process. This is accomplished by either passing the woven fabric or continuous warp threads through a bath containing a polycarbonate resin in suitable solvent or by applying the resin solution to the reinforcing material by means of gravure, machined, or etched rollers. The reinforcing material thus impregnated with resin is transported on a continuous belt, covered with a suitable resin parting agent such as silicon compounds. It is then passed through heated chambers or subjected to hot air blowing in order to drive off the solvents. The impregnated material is then passed over or between heated rollers to drive off residual solvents and finally passed through calendering and finishing rollers to obtain desired thickness and surface smoothness.

In some instances, especially in the case of unwoven reinforcements, an extra overlay coating of polycarbonate resin in solution is applied to obtain a thicker overlay polycarbonate film. These processes produce the desired reinforced polycarbonate magnetic tape backing material.

The polycarbonate resins used for impregnating the woven and unwoven backing materials are polymers of diesters of carbonic acid. They can be represented by the general formula $$[R-O-\overset{\overset{\displaystyle O}{\|}}{C}-O-R]_n$$

wherein R is at least a difunctional organic radical as for example, the bisphenol A radical. Where R is the bisphenol A radical, the polycarbonate resin can be generally represented as:

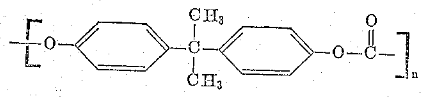

The completed reinforced plastic impregnated backing material either woven or unwoven is then coated on one of its surfaces with a magnetic ferric oxide coating. The coating material is composed of finely divided particles of magnetic ferric oxide evenly dispersed in a suitable polycarbonate solvent containing some polycarbonate resin to control viscosity. This viscous magnetic coating material is applied to the plastic impregnated backing material by means of a continuous process textile coating machine. The magnetic coating thus applied has superior adhesion properties owing to the action of the solvents on the polycarbonate surface of the backing material of the tape which will form a homogeneous material.

The magnetic tapes of the invention can be illustrated by the accompanying drawing wherein a plan cutaway view of the magnetic tape is shown containing word legends to the three sections shown. The left section of the drawing shows the backing material or reinforcement which may be continuous multi-filament glass yarns and/or continuous multi-filament saponified acetate yarns. The center section of the drawing illustrates the backing material or reinforcement impregnated or bonded with polycarbonate resin. The right section of the drawing shows the magnetic ferric oxide coating.

The following examples are illustrative of improved magnetic tapes according to the invention:

*Example 1.*—A woven ribbon is made as follows. Warp composed of continuous multi-filament low twist glass yarns of approximately 50 denier having 60 threads per inch woven plain weave with 52 picks of continuous multifilament low twist glass yarn of approximately 25 denier is impregnated with polycarbonate resin using standard impregnating and laminating machines to produce a material having uniform thickness and a smooth surface. The impregnating and laminating solution used is made from 78 parts by weight of methylene chloride, 8.7 parts by weight of tetrachloroethane, and 13.3 parts by weight of polycarbonate resin.

The resulting reinforced magnetic tape backing material is then coated with a magnetic coating solution made from magnetic ferric oxide particles dispersed in a solution having substantially the same ingredients as above with additional methylene chloride added to attain a viscosity of about 5.0 poises. This magnetic coating is then applied to one of the surfaces of the reinforced polycarbonate magnetic tape backing material by means of a continuous process textile coating and finishing machine. The application of the magnetic coating in this manner forms a homogeneous bond with the backing material resulting in excellent adhesion. The magnetic tape is suited for use in highly sensitive electronic applications, such as automatic data processing equipment for satellite and space applications.

*Example 2.*—The same warp and filling as in Example 1, but with 110 threads per inch in the warp and 72 picks per inch in the filling and woven 4 shaft broken twill, is impregnated and laminated with polycarbonate resin and then coated on its smooth surface with magnetic ferric oxide as in Example 1. The resulting magnetic tape is suited for use in highly sensitive electronic applications.

*Example 3.*—The same warp and weave as in Example 2 but woven with 76 picks per inch of multi-continuous 20 filament saponified acetate yarn having 0.5 turn per inch is impregnated and laminated with polycarbonate resin and then coated on its smooth surface with magnetic ferric oxide as in Example 1. The resulting magnetic tape is suited for use in highly sensitive electronic applications.

*Example 4.*—A woven ribbon one inch in width is made as follows. Warp 120 ends 20 denier 40 continuous filament 0.5 twist per inch saponified acetate yarn is woven 5 shaft satin with 76 picks of 12 denier continuous 20 filament saponified acetate yarn having 0.5 turn per inch. The ribbon is impregnated and laminated with polycarbonate resin and then coated on its smooth surface with magnetic ferric oxide as in Example 1. The resulting magnetic tape is suited for use in highly sensitive electronic applications.

*Example 5.*—A warp one inch in width made from 120 threads laid flat, parallel, and evenly spaced of 25 denier continuous multi-filament glass yarn having one turn per inch or of 12 denier continuous multi-filament saponified acetate yarn having 0.5 turn per inch is fed onto a continuous moving belt composed of kraft paper coated with a silicon parting agent or other suitable material. The moving belt on which the warp threads are laid is previously wetted with a polycarbonate resin to keep the thread adhered to the belt until they pass through further impregnating, laminating, and finishing equipment as described in Example 1. Instead of the threads being fed from a warp beam they may be fed directly from spools, bobbins, or pirns fastened to a creel and passed through tension guides and glass or steel condensing reeds to attain the correct width and ends per inch. This system produces a reinforced polycarbonate magnetic tape backing material having high unidirectional strength but low transverse strength as the transverse strength is subject to the strength of the resin used. Unwoven ultra-thin reinforced tapes 0.5 mil and under have been made by this system.

*Example 6.*—This system is essentially the same as that described in Example 5 except that a wide warp is used which after being laminated and coated with the magnetic ferric oxide is slit lengthwise to the desired width by knives or a hot wire method to prevent unraveling of the edges.

*Example 7.*—Another method of obtaining a woven reinforcement is now illustrated. This consists of the same type woven construction as described in Examples 1 through 4 inclusive except that instead of being woven as a ribbon of a predetermined width, it is woven as broad goods of any width which after resin impregnating and magnetic oxide coating processes is slit lengthwise to any desired width by means of hot wire, knives, etc. Though this produces a less expensive woven reinforcement, it might be subject to edge fraying which is not inherent in the woven ribbon type reinforcement. Therefore, this system does not have the reliability and stability of the woven ribbon type reinforcement for highly sensitive electronic applications, but it has been found reliable and stable enough for less sensitive applications as, for example, for audio tapes.

In the above examples, the thickness of the magnetic tape backing material is about 0.5 to 1 mil and the additional magnetic oxide coating adds about 0.3 mil to the thickness of the backing material. The amount of polycarbonate resin used for impregnating the backing material is dependent on the weave, yarn, and type of backing material and may be altered to obtain proper flow of the resin impregnating solution and proper resin impregnation. The amount of magnetic ferric oxide dispersed in the coating solution is dependent on the amount of magnetic ferric oxide required to obtain the desired electrical magnetic properties.

The impregnated backing materials of Examples 1–7 inclusive have very low elongation, practically no permanent set, high dimensional stability, increased adhesion to magnetic coatings, and over twice the strength of commercially available magnetic tape backing materials. They have a heat resistance approximately 200° F. in excess of that required for automatic data processing equipment and satellite electronic communication systems.

It is intended that the foregoing disclosure be considered illustrative only and not in limitation of the invention as hereinafter claimed.

What is claimed is:

1. A magnetic tape comprising a backing material impregnated and bonded with a polycarbonate resin wherein the backing material is selected from at least one member of the group consisting of continuous multi-filament glass yarns and continuous multi-filament saponified acetate yarns and where the impregnated backing material bears on one of its surfaces a magnetic coating homogeneously bonded to said polycarbonate resin impregnated backing material, said magnetic coating being a dispersion of magnetic ferric oxide powder in polycarbonate resin.

2. A magnetic tape according to claim 1 wherein the continuous multi-filament yarns are woven.

3. A magnetic tape according to claim 1 wherein the continuous multi-filament yarns are unwoven and unidirectional.

References Cited by the Examiner

UNITED STATES PATENTS

| | | | |
|---|---|---|---|
| 2,680,272 | 6/54 | Radtke | 117—126 |
| 2,887,454 | 3/59 | Toulmin | 252—62.5 |
| 2,991,198 | 7/61 | Abeck et al. | |
| 3,080,342 | 3/63 | Lee et al. | 260—77.5 |

FOREIGN PATENTS

| | | |
|---|---|---|
| 1,035,375 | 7/58 | Germany. |
| 683,505 | 11/52 | Great Britain. |
| 717,537 | 10/54 | Great Britain. |
| 628,822 | 10/61 | Canada. |

OTHER REFERENCES

De Danie: "Glass Fibre Reinforced Plastics," 1960, London, pp. 1, 11–15, and 19–22.

WILLIAM D. MARTIN, *Primary Examiner.*

RICHARD D. NEVIUS, JOSEPH B. SPENCER, MURRAY KATZ, *Examiners.*